Oct. 12, 1965  M. SETTERWALL  3,211,625
BOILING REACTOR WITH SUPERHEAT
Filed Aug. 27, 1963
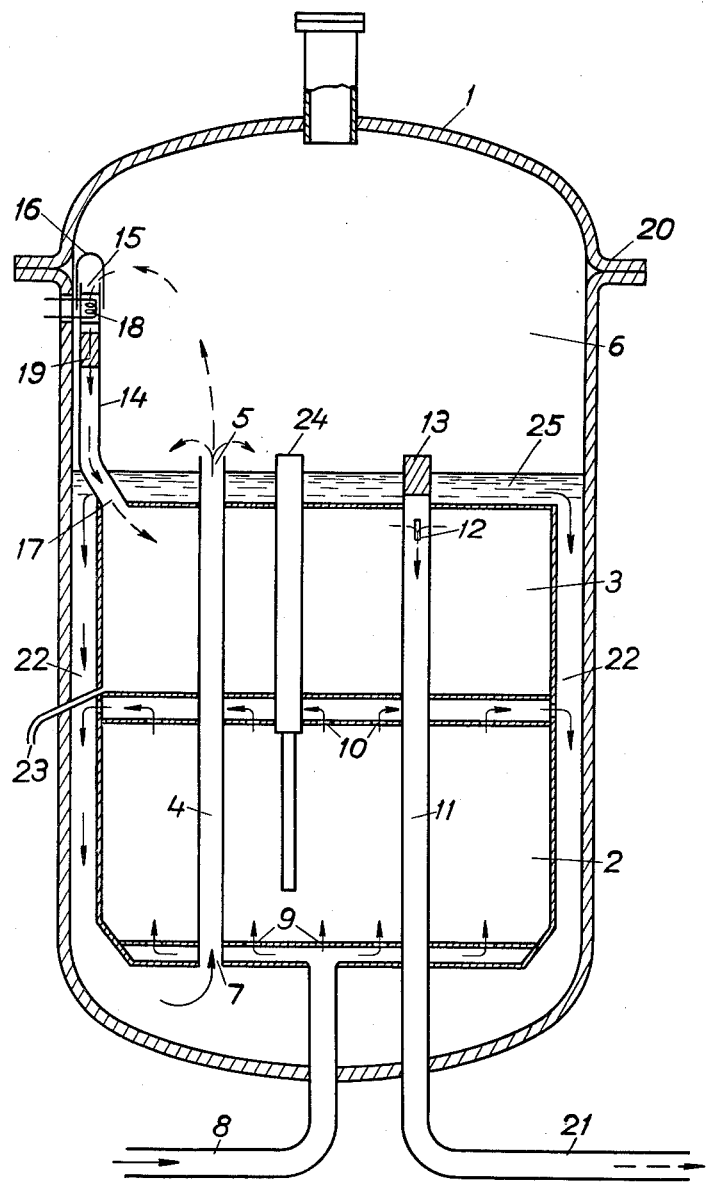
INVENTOR.
MAX SETTERWALL
BY Bailey, Stephens and Huettig
ATTORNEYS 3,211,625
BOILING REACTOR WITH SUPER HEAT
Max Setterwall, Irsta, Sweden, assignor to Allmanna
 Svenska Elektriska Aktiebolaget, Vasteras, Sweden, a
 corporation of Sweden
Filed Aug. 27, 1963, Ser. No. 304,818
Claims priority, application Sweden, Sept. 7, 1962,
9,669/62
9 Claims. (Cl. 176—54)

In boiling reactors with internal nuclear super heat the steam separation normally takes place in the guide and support structure situated above the reactor core. The outlet ports for the tubes for generating steam as well as moisture separators and inlet ports for steam in the tubes for superheating steam are thereby situated in the guide and support structure. A disadvantage of these boiling reactors is inter alia the difficulties to produce an effective steam separation as a result of the limited level difference between the outlet ports of the tubes for generating steam and the inlet ports of the tubes for superheating steam and the limited space which is at disposal in the guide and support structure, where the tubes for fuel element and possible control elements require large space.

These difficulties are removed according to the present invention. Moreover several other advantages are attained by means of the invention.

The invention relates to a boiling reactor with nuclear super heat provided with a reactor core, a guide and support structure arranged above the reactor core, and a steam dome arranged above the guide and support structure, in which steam of the reactor coolant, generated in tubes arranged with a part of their length in the reactor core and a part of their length in the guide and support structure, and containing fuel elements at least in the part arranged in the reactor core, is superheated in tubes arranged with a part of their length in the reactor core and a part of their length in the guide and support structure and containing fuel elements at least in the part arranged in the reactor core and provided with inlet ports for steam in the part arranged in the guide and support structure. It is characterized in that the guide and support structure constitutes a substantially closed vessel through which the tubes for generating steam and the tubes for superheating steam are running and that outlet ports of the tubes for generating steam for a mixture of steam and liquid of the coolant generated in the tubes are arranged above the vessel in the steam dome, which via steam channels with inlet ports arranged relatively high above the outlet ports of the tubes for generating steam and with outlet ports in the guide and support structure is in communication with the interior of the guide and support structure and with the tubes for superheating steam. The steam generated in the boiling reactor is thus forced to pass the steam dome and into the arranged steam channels, before it reaches the guide and support structure in the reactor core, which is steam-filled.

Return of liquid coolant separated in the steam dome to the lower part of the reactor may occur through one or several suitably arranged current channels. This or these may for example go through the guide and support structure and reactor core or consist of a tube running outside the reactor tank, which connects the bottom of the steam dome with the lower part of the reactor. According to an advantageous embodiment the return of the liquid coolant separated in the steam dome may occur by means of a downcomer arranged between the side walls of the guide and support structure and the walls of the reactor. It is convenient to make the steam channels as tubes arranged substantially vertically along the periphery of the steam dome and to arrange moisture separator at the inlet ports of the steam channels. The inlet ports of the tubes for superheating steam in the guide and support structure are arranged high above its bottom.

As previously mentioned a considerably improved steam separation can be obtained with the arrangement according to the invention. The level difference between the outlet ports of the tubes for generating steam and the inlet ports of the steam channels may namely be made considerably larger than in earlier known reactors, since practically the whole steam dome height is at disposal for effecting the level difference. In addition a greater separation surface is obtained and thereby lower steam speed, since the separation takes place above the guide and support structure where no tubes for fuel element and no control elements are present which require space. Another advantage of the greatest importance is that the natural circulation in the tubes for generating steam is improved through the level difference between their outlet ports and the reactor core being greater. This latter advantage is attained without the necessary coolant volume increasing markedly, since the guide and support structure is steam-filled and thereby acts as cheap filler. A further advantage is that the moisture separators can be moved up on a level with the reactor tank flange and thereby be very easily accessible for cleaning and repair.

The invention will be further described in connection with the description of an embodiment with reference to accompanying drawing which shows a boiling reactor according to the invention.

In the reactor tank 1 is the reactor core 2 and above it the guide and support structure 3 is arranged. The guide and support structure is made as a substantially closed vessel, through which runs a number of tubes for generating steam coming from the reactor core 2, and containing fuel elements, in the parts situated in the reactor core. The fuel elements are in direct contact with liquid coolant. In the exemplified case the coolant consists of heavy water. These tubes 4 of which only one is shown in the figure have no connection with the interior of the guide and support structure. Their outlet ports 5 are situated above the guide and support structure 3 in the steam chamber 6. They are fed with heavy water through openings 7. The heavy water is fed into the reactor tank via the conduit 8 and into the reactor core 2 via the openings 9, where it is used as moderator before it passes on via the openings 10 to the openings 7 of the tubes for generating steam. Through the reactor core 2 and the guide and support structure 3 also run tubes 11 for superheating steam containing fuel elements in the parts situated in the reactor core. These fuel elements are in contact with the coolant in steam form. These tubes 11, of which only one is shown in the figure are in communication with the interior of the steam-filled guide and support structure 3 via inlet ports 12. The tubes 11 for superheating steam are during normal operation closed at the top, e.g. with plugs 13, which may be removed e.g. at fuel change. Through the guide and support structure also run a number of control elements 24.

The steam which leaves the outlet ports 5 of the tubes for generating steam and goes out into the steam chamber 6, is taken from there through a number of tubes 14 placed along the periphery of the steam chamber. The inlet ports 15 of the tubes and the moisture separators 16 arranged there are situated high above the roof of the guide and support structure and their outlet openings 17 in the upper part of the guide and support structure. The steam tubes 14 are also provided with devices 18 for lesser superheating of the steam so that water drops which could remain in the steam after the moisture separation are removed and impurities dissolved in these water drops which are damaging for the reactor fuel elements in the tubes for superheating steam, e.g. chlorides, are at the same time retained. In addition there are recombiners 19 of catalytic type in the steam tubes for decreasing the radiolytically-formed oxyhydrogen gas content. By means of the invention it is possible to place the devices 15, 16, 18 and 19 substantially on a level with the flange 20 of the reactor tank 1 so that they are easily accessible for cleaning and repair. From the interior of the guide and support structure the steam goes into the tubes 11 via the channels 12 to be superheated and from there through the tube 21 for further use, e.g. for operation of turbines. Liquid coolant 25 separated in the steam chamber 6 is returned to the bottom of the reactor tank via downcomers 22 between the side walls of the guide and support structure 3 and the walls of the reactor tank 1. In the interior of the guide and support structure 3 possible separated condensate may via the drainage tube 23 be fed to a point on the feedwater side of the reactor system, which works at lower pressure than the reactor.

I claim:

1. Boiling reactor with nuclear super-heating comprising a reactor core, a guide and support structure arranged above the reactor core, a steam dome arranged above the guide and support structure, first tubes for generating steam from a reactor coolant each arranged with a part of its length in the reactor core and a part of its length in the guide and support structure and containing fuel elements at least in the parts arranged in the reactor core, and second tubes for superheating the steam generated in the first tubes each arranged with a part of its length in the reactor core and a part of its length in the guide and support structure and containing fuel elements at least in the parts arranged in the reactor core and having inlet ports for the steam in the parts arranged in the guide and support structure, said guide and support structure constituting a closed vessel through which the first and second tubes extend, said first tubes having outlet ports for a mixture of steam and liquid from the reactor coolant generated therein positioned above the support structure within the steam dome, and at least one steam channel having an inlet port arranged above the outlet ports of the first tubes in the steam dome and an outlet port into the guide and support structure, so that the steam dome is in communication with the interior of the guide and support structure and with the second tubes.

2. In a reactor as claimed in claim 1, having means forming a collecting chamber below the core, means to conduct liquid coolant from the steam dome to said space, said first tubes communicating with said collecting chamber.

3. In a reactor as claimed in claim 1, having a tank enclosing the core and the guide and support structure, the top of the tank constituting the steam dome and the bottom constituting a collecting chamber below the core, the first tubes communicating with the collecting chamber, and having passages between the tank wall and the guide and support structure connecting the steam dome with the collecting space to conduct liquid coolant downwardly therethrough.

4. In a reactor as claimed in claim 1, in which the steam channel in the steam dome comprises a tube arranged substantially vertically along the wall of the steam dome.

5. In a reactor as claimed in claim 1, a moisture separator at the inlet port of the steam channel.

6. In a reactor as claimed in claim 1, heating means connected to said steam channel for superheating the steam passing through the steam channel.

7. In a reactor as claimed in claim 1, a recombiner for recombining radiolytic decomposition products of the coolant connected to the steam channel.

8. In a reactor as claimed in claim 1, which is bounded at the top by a lid, the connection of the lid to other reactor walls being located in the steam dome above the bottom thereof and in which a reactor moisture separator is arranged at the inlet port of the steam channel, heating means are provided for superheating of the steam passing through the steam channel, and a recombiner for recombining radiolytic decomposition products of the coolant is connected to the steam channel, said moisture separator, heating means and recombiner being arranged substantially on the same level as said connection.

9. In a reactor as claimed in claim 1, removable means closing the second tubes to allow for change of fuel elements.

References Cited by the Examiner

UNITED STATES PATENTS

| 3,041,264 | 6/62 | Ricard | 176—54 |
| 3,049,487 | 8/62 | Harrer et al. | 176—54 |
| 3,108,937 | 10/63 | Kumpf et al. | 176—61 |

FOREIGN PATENTS

| 1,141,064 | 3/57 | France. |
| 1,168,933 | 9/58 | France. |
| 875,329 | 8/61 | Great Britain. |

CARL D. QUARFORTH, *Primary Examiner.*